United States Patent [19]

Fatehi

[11] Patent Number: 6,122,096
[45] Date of Patent: Sep. 19, 2000

[54] EXPANDABLE WAVELENGTH-SELECTIVE AND LOSS-LESS OPTICAL ADD/DROP SYSTEM

[75] Inventor: Mohammad Taghi Fatehi, Middletown, N.J.

[73] Assignee: Lucent Technologies Inc., Murray Hill, N.J.

[21] Appl. No.: 08/920,390

[22] Filed: Aug. 29, 1997

[51] Int. Cl.[7] .............................. H01S 3/10; H04B 10/16; H04J 14/02; G02B 6/28
[52] U.S. Cl. .......................... 359/341; 359/124; 359/130; 385/37
[58] Field of Search ..................................... 359/124, 127, 359/130, 341, 160, 349, 337; 385/37

[56] References Cited

U.S. PATENT DOCUMENTS

| | | | |
|---|---|---|---|
| 5,058,974 | 10/1991 | Mollenauer | 359/341 |
| 5,218,608 | 6/1993 | Oaki | 372/6 |
| 5,579,143 | 11/1996 | Huber | 359/130 |
| 5,600,473 | 2/1997 | Huber | 359/179 |
| 5,633,741 | 5/1997 | Giles | 359/124 |
| 5,742,416 | 4/1998 | Mizrahi | 359/134 |
| 5,778,118 | 7/1998 | Sridhar | 359/114 |

FOREIGN PATENT DOCUMENTS

| | | |
|---|---|---|
| 26368495 | 9/1995 | Japan . |
| 7095196 | 3/1996 | Japan . |

OTHER PUBLICATIONS

"Low–Loss Add/Drop Multiplexers for WDM Lightwave Networks" by C. R. Giles of AT&T Bell Laboratories, Crawford Hill Laboratory, Holmdel, NJ 07733–0400, and V. Mizrahi of AT&T Bell Laboratories, Murray Hill, NJ 07974–0636, IOOC–95, pp. 66–68.

"Repeatered Bidirectional 10 Bb/s–240 km Fiber Transmission Experiment" by J.–M. P. Delavaux, C. R. Giles, S. W. Granlund, and C. D. Chen; Lucent Technologies Inc., Bell Laboratories, Breinigsville, Pennsylvania 18031–9351 and Lucent Technologies Inc., Bell Laboratories, Crawford Hill, New Jersey 07733–0400; Optical Fiber Technology 2, pp. 351–357 (1996), Article No. 0040.

"Long–period fiber–grating–based gain equalizers" by Ashish M. Vengsarkar, J. Renee Pedrazzani, Justin B. Judkins, and Paul J. Lemaire of AT&T Bell Laboratories, 600 Mountain Avenue, Murray Hill, New Jersey 07974 and Neal S. Bergano and Carl R. Davidson of AT&T Bell Laboratories, 101 Crawfords Corner Road, Holmdel, New Jersey 07733; Optics Letters, vol. 21, NO. 5, Mar. 1, 1996; pp. 336–338.

"Strong Bragg Gratings in Non Sensitized Low Loss Planar Waveguides as Building Blocks for WDM Network Components" by Jorg Hubner, Jean–Marc Jouanno, Jens Engholm Pedersen, Rasmus Kromann, Thomas Feuchter and Martin Kristensen; Mikroelektronik Centret, Technical University of Denmark, DK–2800 Lyngby, Denmark and NKT Research Center A/S, Sognevej 11, DK–2065 Brondby, Denmark, SPIE vol. 2998, No. 12, Photonics West 97, San Jose, CA 1997; pp. 1–11.

*Primary Examiner*—Nelson Moskowitz
*Attorney, Agent, or Firm*—Gregory J. Murgia

[57] ABSTRACT

An expandable optical add/drop system according to the present invention includes an optical add/drop multiplexer with an integrated amplification and wavelength-selective fiber path and passive optical couplers for selectively adding and dropping wavelengths from a multi-wavelength signal, such as a wavelength division multiplexed optical signal. One or more fiber gratings are disposed along the length of a rare earth-doped optical fiber or between segments of the rare earth-doped optical fiber so that at least one grating is used for reflecting each optical signal that is to be added to or dropped from the multi-wavelength optical signal. By using this configuration, appropriate amplification is provided to compensate for specific losses in the add, drop, and through paths for existing and future add/drop service.

29 Claims, 3 Drawing Sheets

EXPANDABLE WAVELENGTH-SELECTIVE AND LOSS-LESS OPTICAL ADD/DROP SYSTEM

CROSS REFERENCES TO RELATED APPLICATIONS

This application is related to another U.S. patent application, Ser. No. 18/920,391, entitled "Wavelength Selective and Loss-Less Optical Add/Drop Multiplexer", filed concurrently herewith, having a common inventor and assignee and incorporated herein by reference.

FIELD OF THE INVENTION

This invention relates generally to optical components for lightwave communications networks, and, more particularly, to an optical add/drop system used for removing and inserting individual optical channels of different wavelengths from a multi-wavelength optical signal in an optical network with expanding add/drop requirements.

BACKGROUND OF THE INVENTION

Wavelength division multiplexing (WDM) is commonly used in lightwave communications systems to provide increased transmission capacity. As is known to those skilled in the art, the addition of an optical add/drop capability in WDM-based systems provides added flexibility for removing and adding individual channels at intermediate nodes in the WDM transmission path, which further enhances the management of optical transmissions in lightwave communications systems.

In general, most prior art optical add/drop multiplexers (ADMs) utilize fixed or tunable fiber gratings to provide the necessary wavelength selectivity for the add/drop function. These prior art ADMs, whether of the fixed or tunable type, suffer numerous disadvantages, including: path loss for added, dropped, and "through" wavelengths; high implementation costs; and numerous design limitations. Some prior art ADMs attempt to compensate for losses by utilizing optical circulators and fiber gratings in conjunction with a "complete" optical amplifier, commonly referred to as a "lumped" amplifier. This type of ADM typically includes fiber gratings disposed between a first and second optical circulator with a "lumped" amplifier at the input side of the first circulator. The lumped amplifier at the input side is able to provide gain for the optical signals that are dropped via the first circulator as well as those optical signals that pass through the ADM without being dropped. However, the optical signals that are added via the second circulator do not pass through the lumped amplifier. Consequently, this type of ADM does not effectively compensate for the insertion loss experienced by the optical signals in the add path of the ADM. Similarly, a lumped amplifier placed at the output side of the second circulator cannot effectively compensate for the insertion loss in the drop path because the optical signals reflected by the fiber gratings and dropped via the first circulator do not pass through the lumped amplifier at the output side of the second circulator. In sum, the lumped amplifier approach does not provide an efficient amplification scheme for ADMs. Furthermore, adding more lumped amplifiers to the various paths within an ADM only adds to the cost and complexity of the system.

These disadvantages are compounded if additional channels are added or dropped as part of a future service upgrade. More specifically, add/drop devices in typical lightwave communications systems are designed to accommodate a predetermined number of channels for adding and dropping, because the losses associated with adding and dropping must be accounted for in each of the output paths of the add/drop device. In particular, more loss is introduced as more channels are added and dropped. In order to provide a less lossy drop or add operation, some prior art ADMs utilize wavelength multiplexers and demultiplexers to further combine or split the optical signals in the add and drop paths, respectively. For example, the wavelength demultiplexer receives a composite optical signal and then demultiplexes and filters out each of the individual channels accordingly. However, wavelength multiplexers and demultiplexers impose several limitations on the add/drop capability of a system. Aside from being costly, these devices have a finite number of ports so that a future service upgrade, such as the removal or insertion of additional channels, requires a complete replacement of the multiplexer or demultiplexer. This approach results in an interruption of existing add/drop service while the hardware is being replaced to accommodate the new service. Moreover, the operation of these devices is not cost effective, because the entire optical signal is multiplexed or demultiplexed regardless of whether each of the individual channels is being used.

Consequently, prior art systems are limited because the add/drop capability cannot be expanded without significant redesign or reengineering. In particular, the lumped amplifier must be redesigned or additional lumped amplifiers must be added in order to compensate for the additional losses associated with the expansion of add/drop service. Additionally, service interruptions occur when individual components within the drop and add paths must be replaced to accommodate additional channel adds/drops. In all cases, this redesign results in increased cost, added design complexity, and disruption of existing add/drop service. Accordingly, there is a need for a loss-less, highly wavelength-selective optical add/drop system that is expandable to accommodate service upgrades without disrupting existing service.

SUMMARY OF THE INVENTION

An expandable optical add/drop system is achieved according to the principles of the present invention using a configuration that includes an optical add/drop multiplexer with an integrated amplification and wavelength-selective fiber path and passive optical couplers for selectively adding and dropping wavelength signals from a multi-wavelength signal, such as a wavelength division multiplexed optical signal. By using this configuration, appropriate amplification is provided to compensate for specific losses in the add, drop, and through paths. Moreover, by integrating the amplification and wavelength-selective add/drop functions, an expandable architecture is provided which supports additional add/drop service without disrupting existing service.

Generally, the expandable add/drop system according to the present invention comprises an appropriate length of rare earth-doped optical fiber coupled between two directional optical transfer devices. One or more fiber gratings are disposed along the length of the rare earth-doped fiber or between segments of the rare earth-doped fiber so that at least one grating is used for each individual optical signal in the multi-wavelength signal that is to be added or dropped. Passive optical couplers are used in the drop and add paths for splitting and combining the optical signals as appropriate.

In an illustrative embodiment of the present invention, the expandable add/drop system is comprised of an erbium-doped optical fiber coupled between a first and second optical circulator. The erbium-doped optical fiber is divided into at least two segments so that fiber gratings, such as Bragg gratings, can be disposed along or between the segments to provide a band reflective filtering function. An optical signal, such as a wavelength division multiplexed (WDM) signal having a plurality of optical carriers of different wavelengths, is provided as input to the first optical circulator. The WDM signal exits the first optical circulator and is amplified by at least one of the erbium-doped optical fiber segments prior to reaching the Bragg gratings. The Bragg gratings are adapted by fabrication, and even tuning, to reflect a subset of optical signals of selected wavelengths back toward the first optical circulator. These reflected signals are then dropped using passive optical splitters and tunable optical filters. Those optical signals not reflected by the Bragg gratings pass through to a second circulator for transmission with other optical signals of selected wavelengths that are added via passive optical combiners and optical transmitters. By optically pumping the erbium-doped fiber amplifier with an appropriate pump signal wavelength, the erbium-doped optical fiber acts as a traveling wave amplifier that compensates for losses where they occur, thereby assuring a substantially path equalized signal at each output of the ADM. The present invention is expandable in that the integrated amplification scheme effectively compensates for additional losses that occur as a result of adding more passive optical couplers to accommodate additional add/drop service requirements.

Consequently, the present invention provides a loss-less, wavelength-selective add/drop capability that overcomes the shortcomings of the prior art optical add/drop multiplexer configurations.

BRIEF DESCRIPTION OF THE DRAWING

A more complete understanding of the present invention may be obtained from consideration of the following detailed description of the invention in conjunction with the drawing, with like elements referenced with like references, in which.

DETAILED DESCRIPTION OF THE INVENTION

Figure 1:
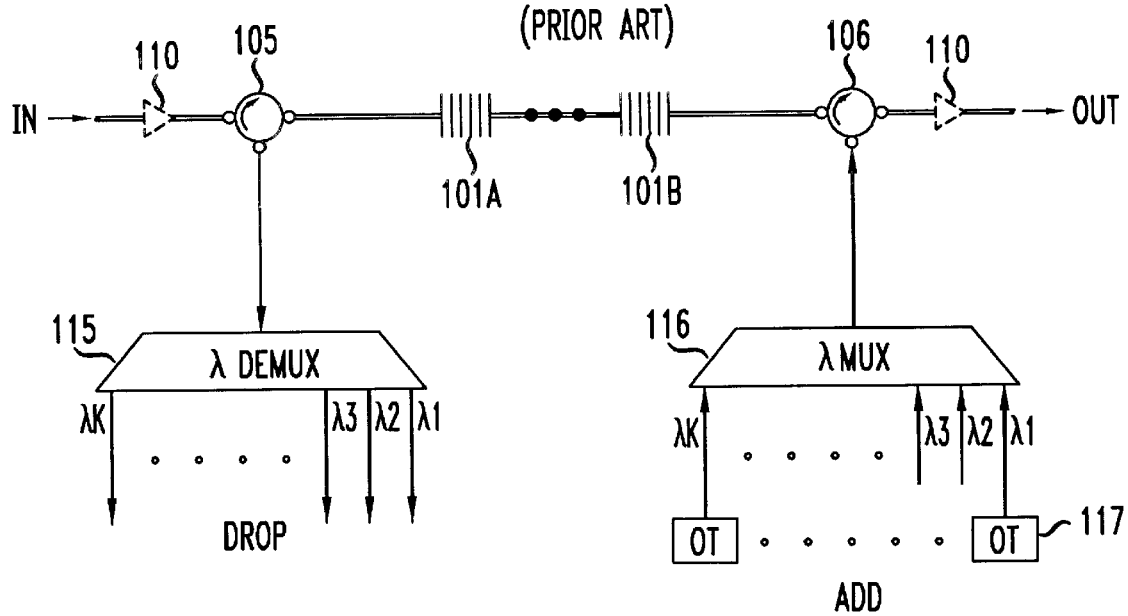
FIG. 1 shows a typical prior art add/drop multiplexer configuration.

A more complete understanding of the present invention can be obtained in view of a brief description of the prior art add/drop multiplexers (ADMs). Accordingly, FIG. 1 shows a typical prior art ADM configuration in which fiber gratings 101A and 101B are used in conjunction with optical circulators 105 and 106 along with a lumped amplifier 110 placed at the input side or output side of the ADM. Fiber gratings 101A and 101B are set to reflect those optical signals to be dropped via circulator 105 as well as those optical to be added via circulator 106. The composite optical signal to be dropped is demultiplexed by a wavelength demultiplexer 115, which typically includes integrated filters to provide the individual optical signals of different wavelengths at the outputs of the demultiplexer 115. As shown and previously described, the entire reflected composite optical signal is demultiplexed regardless of whether each individual channel is being used. Adding optical signals to the multi-wavelength signal is accomplished using an optical transmitter 117 to generate each individual optical signal having a particular wavelength. The individual optical signals are then combined in a wavelength multiplexer 116 and a composite signal is provided at the input of optical circulator 106 for transmission along with the non-reflected multi-wavelength optical signal. As previously described, demultiplexer 115 and multiplexer 116 have a finite number of ports thus limiting the ability to add or drop additional channels without disrupting existing service. Moreover, the amplification scheme must be modified to compensate for additional losses associated with expanding the add/drop service. Modifying lumped amplifier 110 or adding additional lumped amplifiers adds considerable design complexity and cost to the system, disrupts existing service, and does not effectively compensate for all of the insertion losses in the add, drop and "through" paths.

Figure 2:
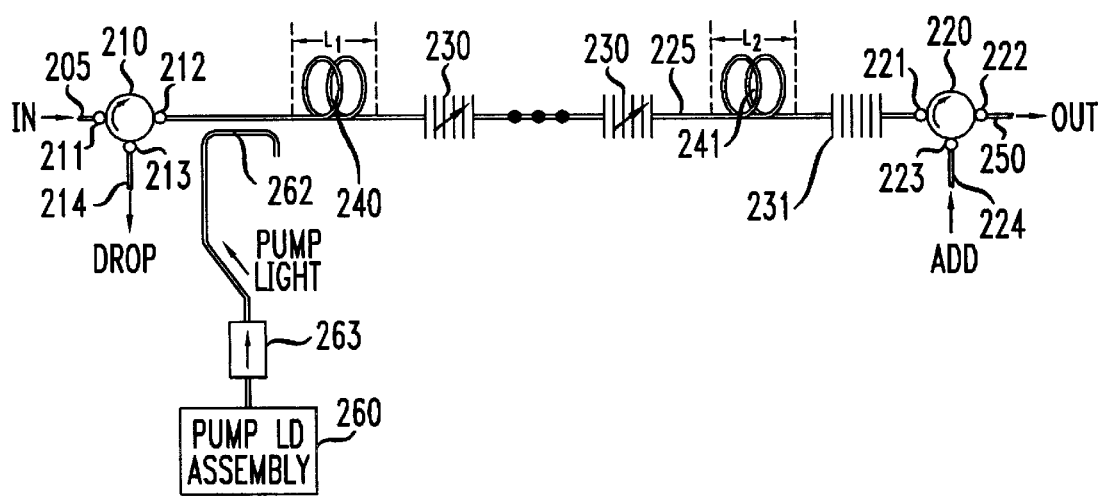
FIG. 2 shows a loss-less optical add/drop multiplexer configuration used in the present invention.

Referring to FIG. 2, there is shown an exemplary embodiment of an ADM according to the principles of the present invention that incorporates a rare earth-doped fiber amplifier configuration as an integrated part of the wavelength-selective ADM. One example of an increasingly common type of rare earth-doped fiber amplifier suitable for the present invention is an erbium doped-fiber amplifier (EDFA). Accordingly, because the use of EDFA's and the associated benefits are well known in the art, the present invention will be described with respect to the use of an EDFA. However, it is also contemplated that other suitable rare earth elements may be used, such as praseodymium, neodymium, and the like.

In general, the benefits of the present invention are achieved by judiciously integrating an amplification medium and a wavelength-selective fiber path between two directional optical transfer devices. As shown in FIG. 2, the present invention includes an erbium doped-fiber amplifier (EDFA) comprised of at least two segments of erbium-doped fiber (EDF) 240 and 241, at least one wavelength selective element 230, a pair of directional optical transfer devices 210 and 220, and a pump arrangement that includes a pump source 260, a coupler 262, and an optional pump isolator 263. By way of example only, wavelength selective elements 230 can be implemented with tunable fiber Bragg gratings and directional optical transfer devices 210 and 220 can be implemented with optical circulators. However, other suitable wavelength selective elements and directional optical transfer devices are known in the art and may be used in the present invention to achieve the same results. It should also be noted that although only two EDF segments are shown in the illustrative embodiments, those skilled in the art will understand from the following teachings that multiple EDF segments may be used without departing from the spirit and scope of the present invention.

Input port 211 of optical circulator 210 is coupled to input optical fiber 205 carrying a multi-wavelength optical signal, such as a wavelength division multiplexed (WDM) signal comprised of a given number of channels (i.e., optical carriers) each having a different wavelength. EDF segment 240 is coupled to output port 212 of optical circulator 210. EDF segment 241 is coupled to input port 221 of optical circulator 220, and output optical fiber 250 is coupled to output port 222 of optical circulator 220. Optical circulator 210 includes drop port 213 coupled to optical fiber 214 for carrying those selected optical signals which are to be dropped from the multi-wavelength optical signal. Similarly, optical circulator 220 includes add port 223 coupled to optical fiber 224 for carrying those selected optical signals which are to be added to the multi-wavelength optical signal.

Tunable fiber Bragg gratings 230 are disposed between EDF segments 240 and 241. Each of the fiber Bragg gratings 230 is tuned so that at least one fiber Bragg grating 230 is used for each particular wavelength that is to be added or dropped. Stated otherwise, fiber Bragg gratings 230 are adapted to reflect the particular wavelength in the multi-wavelength optical signal that is to be added or dropped. Methods for adapting fiber Bragg gratings using fabrication techniques or other tuning/programming techniques are well known in the art. These fiber Bragg gratings 330 can be spliced into the fiber path between EDF segments 240 and 241, etched directly on the fiber path between EDF segments 240 and 241, or incorporated by other known methods. For additional background information on the use of fiber Bragg gratings as wavelength selective components, see, for example, Hubner et al., *Strong Bragg Gralings in Non Sensitized Low Loss Planar Waveguides as Building Blocks for WDM Network Components*, SPIE Vol. 2998, No. 12, Photonics West 97, San Jose, Calif., 1997.

In one variation of the add/drop multiplexer embodiment shown in FIG. 2, the erbium doped-fiber amplifier can be a single active length of erbium-doped fiber (EDF) comprising two contiguous EDF segments. In this configuration, the tunable fiber Bragg gratings are incorporated along the length of the EDF, e.g., directly etched into the EDF.

Figure 3:
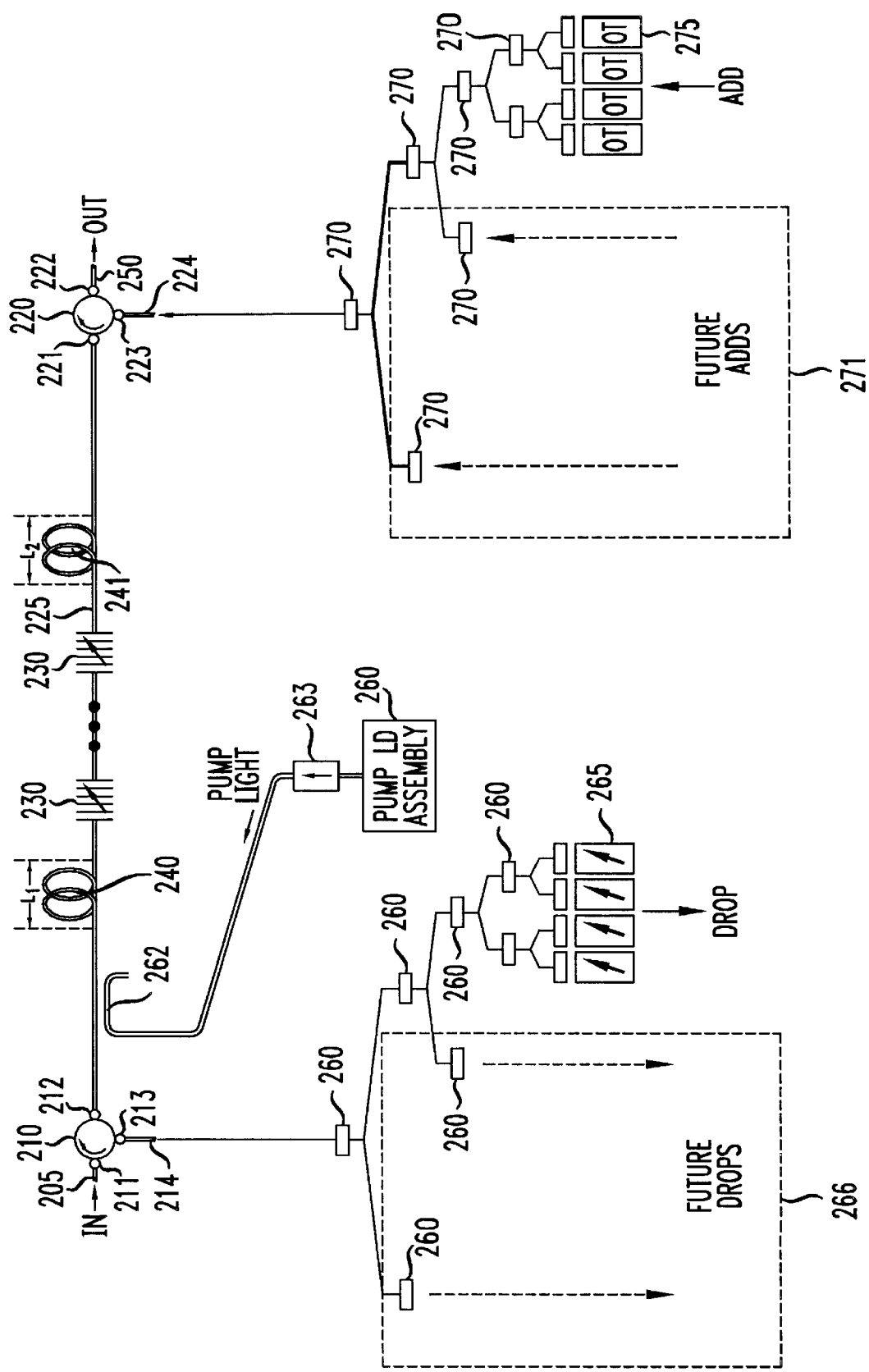
FIG. 3 shows an expandable optical add/drop system using the configuration of FIG. 2 in accordance with the principles of the present invention.

Referring now to FIG. 3, an expandable optical add/drop system is shown which includes the basic add/drop multiplexer previously described and shown in FIG. 2. Passive optical splitters 260, which are coupled to optical fiber 214, are used to receive the reflected optical signal on a single input and split the reflected optical signal onto plural output ports. The characteristics and operation of passive optical splitters 260 are well known to those skilled in the art. Generally, the optical signals reflected by tunable fiber gratings 230 are split onto multiple paths at passive optical splitter 260 so that the reflected optical signals $\lambda_r$ are distributed to each output port of passive optical splitter 260. Consequently, each output port of the passive optical splitters 260 contains all of the reflected optical signals $\lambda_r$. Tunable optical filters 265 are coupled to passive optical splitters 260, each tunable optical filter 265 being adapted to pass only one of the individual optical signals having a particular wavelength. The characteristics and operation of tunable optical filters 265 are also well known to those skilled in the art.

The adding of optical signals in the present invention is accomplished in a complementary manner as that previously described for dropping optical signals. More specifically, optical transmitters 275 are used to generate the optical signals of particular wavelengths which are to be added to the multi-wavelength signal. The outputs from the optical transmitters 275 are coupled to passive optical combiners 270 which combine the optical signals from plural inputs onto a single output. A combined optical signal, which includes each of the individual optical signals to be added, is coupled to the multi-wavelength optical signal via optical fiber 224 and add port 223 of optical circulator 220. The characteristics and operation of passive optical combiners 270 and optical transmitters 275 are also well known to those skilled in the art.

Figure 4:
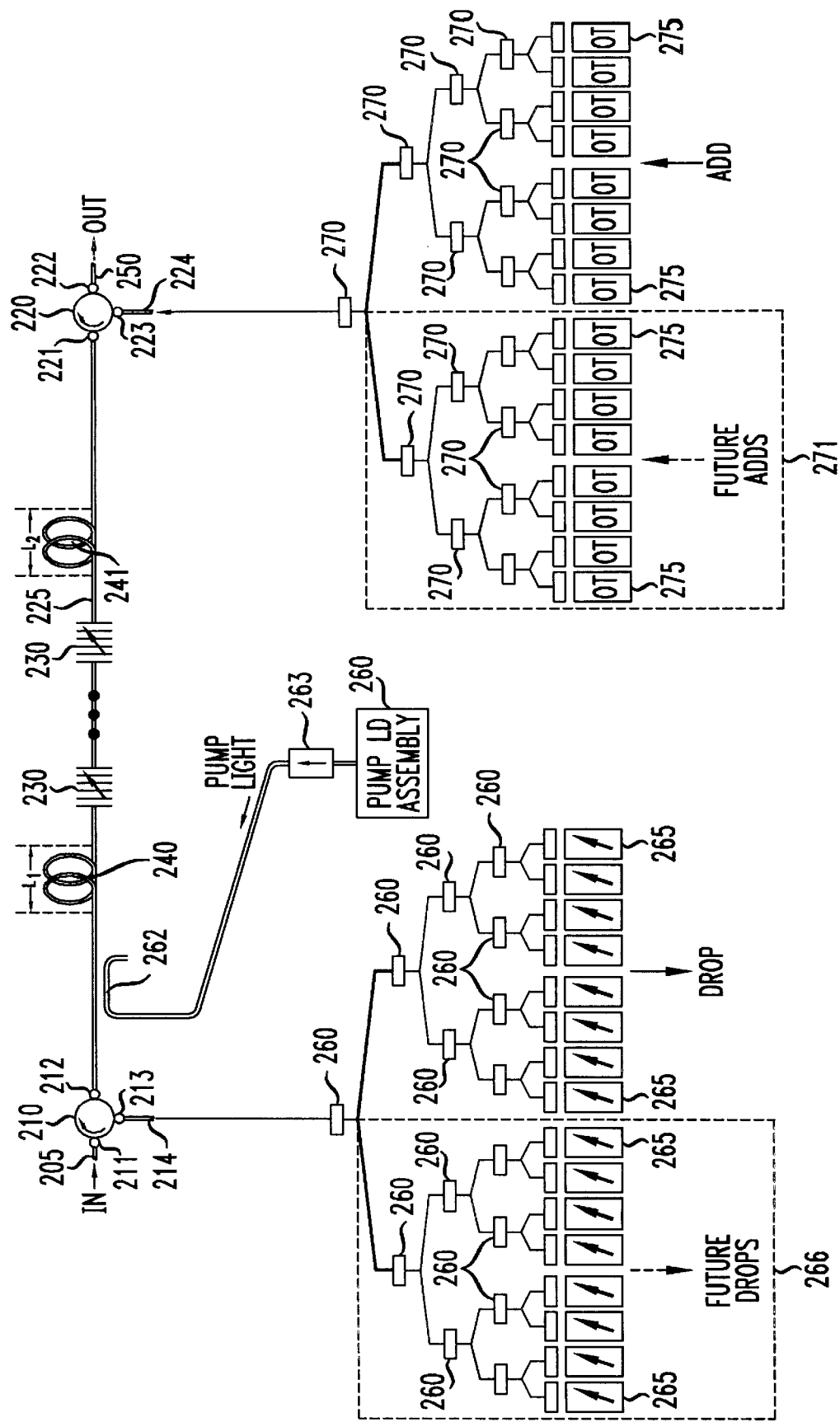
FIG. 4 shows an expanded add/drop configuration for a typical sixteen-wavelength system.

By placing passive optical splitters 260 and passive optical combiners 270 in a tree configuration with multiple branches, the present invention provides an expandable add/drop system in that additional optical signals can be easily dropped and added in accordance with future in-service upgrades, shown as future drops 266 and future adds 271. For example, future drops 266 can be accommodated in the present system by simply adding the appropriate number of passive optical splitters 260 and tunable optical filters 265 to the open branches of existing passive optical splitters 260. Similarly, future adds 271 can be accommodated in the present system by simply adding the appropriate number of passive optical combiners 270 and optical transmitters 275 to the open branches of existing passive optical combiners 270. FIG. 4 illustrates the possible population of future adds 271 and future drops 266 for a 16-wavelength system, which will be described below in more detail. Importantly, the system can grow without having to interrupt the existing add/drop service since the existing branches can remain intact during the in-service upgrade. Moreover, passive optical splitters 260 and passive optical combiners 270 are less expensive than the wavelength demultiplexers and multiplexers found in most prior art systems. This growable configuration is also advantageous in that the system can even accommodate standards-oriented changes, such as future changes to wavelength standards. For example, if the standard wavelengths used for optical transmission networks were to change in the future, multiplexers, demultiplexers, and other fixed devices would have to be changed accordingly in prior art systems. Conversely, the present invention uses passive splitting and combining, so the only changes required would be the re-tuning of the tunable optical filters and the fiber gratings, both of which can be accomplished in a non-disruptive manner.

By way of example only, passive optical splitters 260 can be implemented with connectorized passive 1×N coupler modules and tunable optical filters 265 can be implemented with fiber Fabry-Perot filters. However, many other suitable passive splitting devices and tunable optical filters are known in the art and may be used in the present invention to achieve the same results. It should also be noted that the embodiment shown in FIG. 3 uses connectorized standard 1×2 passive coupler modules having a 3 db loss per coupler module, but this selection is to be construed as illustrative only since other coupler sizes may be equally suitable depending on the given requirements. Similarly, passive optical combiners 270 can be implemented with connectorized passive N×1 coupler modules or any other suitable passive combining devices known in the art. FIG. 3 shows connectorized 2×1 passive coupler modules as combiners, but this selection is also to be construed as illustrative only since other coupler sizes may be equally suitable depending on the given requirements. Again, the connectorized 2×1 coupler modules shown in FIG. 3 are the standard modules having a 3 db loss per coupler module.

In order to provide an amplifying effect, the EDF must be "pumped" so that the erbium ions can be excited to a higher, metastable energy state. As the ions at the higher energy state outnumber those at the normal ground state, a population inversion is created which sets the stage for the EDF to become an active amplifying medium. In the present invention, the EDF is illuminated with pump source 260, which can be a semiconductor laser pump assembly, such as a laser diode pump shown in FIGS. 2 and 3, or any other suitable pump source well known in the art. The luminous energy generated by pump source 260, also referred to as pump light, has a shorter wavelength than any of the wavelengths in the multi-wavelength optical signal (i.e., signal light), and is typically either 980 nm or 1480 nm for an EDFA, depending on the application. Once the erbium ions are excited to the higher metastable state, they will then either spontaneously decay back to the ground state causing spontaneous emission noise, or more significantly, they will be stimulated by an incoming signal photon at any wavelength from the multi-wavelength optical signal thereby emitting coherent photons. Coherent photons, which are photons in the same direction, phase, and wavelength as the incoming signal photon, constitute gain. Stated otherwise, passage of an incoming signal photon from the multiwavelength optical signal having a wavelength corresponding to that of the excited state causes a decay from the excited state to the ground state, but with an associated stimulated emission that amplifies the incoming signal.

Referring to FIGS. 2 and 3, a forward pumping configuration is shown in which the pump light is generated by pump source 260 in the same direction as the signal light from the multiwavelength optical signal. In this forward pumping configuration, or co-propagating pumped configuration, pump source 260 is coupled between output port 212 of optical circulator 210 and EDF segment 240 via wavelength selective coupler 262. Additionally, an optional pump isolator 263 may be coupled at the output of pump source 260 to protect against the return of the pump signal via backscattering or reflections which could damage the laser.

In addition to the co-propagating pump configuration described above, various other pump configurations known to those skilled in the art can be used without departing from the spirit and scope of the present invention. For example, a backward pumping configuration, or counter-propagating pumped configuration, can be used in which pump source 260 could be coupled between EDF segment 241 and input port 221 of optical circulator 220. In this configuration, the pump signal light is generated by pump source 260 in the opposite direction as the signal light from the multiwavelength optical input signal. In a bi-directional pumping configuration, pump signal light is generated in both a forward direction that is coherent with the signal light of the multi-wavelength optical signal, and also in a direction opposite to the signal light from the multi-wavelength optical signal. The EDFA in the present invention can also be pumped by pump signal light from the add port 223 of optical circulator 220. In this variation, the wavelength of the pump signal light generated by pump source 260 must be within the bandwidth of optical circulator 220. Pump source 260 can also be coupled to the input side of the ADM via input port 211 of optical circulator 210. Again, the pump signal wavelength must be within the bandwidth of optical circulator 210. In yet another variation, the pump signal can be combined with other individual optical signals which are added via passive optical combiners 270 (FIG. 3). In each of these variations, it should be noted that the EDF amplifying medium is always between the two optical circulators 210 and 220. For additional background on the various pumping arrangements for erbium-doped fiber amplifiers, see U.S. Pat. No. 5,218,608, *Optical Fiber Amplifier*, issued to Aoki and herein incorporated by reference.

Referring again to FIG. 2, an additional fiber Bragg grating 231, referred hereinafter as pump reflector fiber grating 231, can also be incorporated within the fiber path to fully utilize the pump power generated by pump source 260. In particular, this pump reflector fiber grating 231, which is coupled between EDF segment 241 and input port 221 of optical circulator 220, is adapted (e.g., tuned) to reflect the pump signal from pump source 260. With this arrangement, the unused pump signal is reflected back through EDF segments 241 and 240, respectively, thus improving amplification efficiency. The pump reflector fiber grating 231 can also be effectively used in the other pump configurations previously described.

In another variation of the embodiments previously described, supervisory channels and/or maintenance channels can be added or dropped from the multi-wavelength optical signal as required. Specifically, additional fiber Bragg gratings (not shown) could be inserted between EDF segments 240 and 241 to reflect wavelengths corresponding to the supervisory channels and/or maintenance channels. Alternatively, for supervisory and/or maintenance channels having wavelengths outside of the EDFA spectrum, the additional fiber gratings (not shown) could be placed between optical circulator 210 and EDF segment 240 for dropping or between EDF segment 241 and optical circulator 220 for adding. With these added gratings, supervisory and/or maintenance channels could then be dropped via drop port 213 of optical circulator 210 to preclude unnecessary amplification of these channels across "through" path 225, that is, the path between optical circulators 210 and 220. Similarly, supervisory and/or maintenance channels could be added back into the multi-wavelength optical signal via add port 223 of optical circulator 220 for transmission to the next network element in the lightwave system.

The most important benefits of this unique add/drop configuration, as presently understood, can be appreciated in light of a description of the operation of the add/drop system as shown in FIGS. 3 and 4. In operation, a multi-wavelength optical signal ("input signal") comprising optical signals having wavelengths $\lambda_1$ through $\lambda_n$ is transmitted through input optical fiber 205 and enters input port 211 of optical circulator 210. Pump source 260 supplies a pump signal to place the EDFA, comprising EDF segments 240 and 241, in an amplifying state. Optical circulator 210 circulates the input signal to output port 212 where the input signal is then amplified by EDF segment 240. Fiber Bragg grating or gratings 230 reflect the particular optical signals to be dropped. These optical signals to be dropped have wavelengths represented as $\lambda_r$ (where $\lambda_r = \{\lambda_1, \ldots, \lambda_k\}$, $1 \leq k \leq n$) with $\lambda_r$ being a subset of all wavelengths $\lambda_1$ through $\lambda_n$ in the input signal. As the amplified input signal reaches fiber Bragg grating or gratings 230, optical signals $\lambda_r$ to be dropped are reflected back through EDF segment 240 and back into output port 212 of optical circulator 210. These reflected optical signals $\lambda_r$ are then circulated to drop port 213 where they are then dropped via optical fiber 214. The reflected optical signals $\lambda_r$ are provided as input to passive optical splitter 260 which distributes the reflected optical signals $\lambda_r$ on each of the plural output ports.

As shown in FIG. 3, the passive optical splitters 260 are configured as a tree with multiple branches so that some of the plural output ports are available for future drops 266. As further shown, only 4 wavelength signals within $\lambda_r$ are actually dropped from the system in this particular example. Accordingly, the appropriate number of passive optical splitters 260 and tunable optical filters 265 are included within the drop path. Each of the tunable optical filters 265 receives the composite reflected optical signal $\lambda_r$, but is designed to only pass one of the desired optical signals having a particular wavelength. FIG. 4 shows an example of a typical 16-wavelength system with an initial 50% add/drop service. More specifically, 8 of the wavelengths are dropped as part of the initial configuration and the remaining 8 wavelengths could be dropped as part of a future in-service upgrade as illustrated by the populated future drops 266. It should be noted that FIG. 4 is illustrative of only one exemplary configuration and other various tree configurations can be used accordingly. Consequently, the expandable characteristics of the present invention are particularly well-suited for many different system designs.

The amplification aspects relating to the expansion of the add/drop service will be addressed below in more detail. However, it should be noted that the dropped optical signals $\lambda_r$ are sufficiently amplified by the return trip through EDF segment 240 in order to compensate for any insertion losses that occur within the drop path. Accordingly, it can be seen that the gain of any dropped optical signals is determined by $2 \times L_1$, where $L_1$ is the length of EDF segment 240, since the dropped optical signals pass through EDF segment 240 twice.

Those optical signals not reflected by fiber Bragg grating or gratings 230 continue on "through path" 225 to EDF segment 241 where they are amplified again. As such, the gain of the "through" traffic is determined by $L_1+L_2$ since the "through" signals pass through each EDF segment once. These "through" signals are then input to optical circulator 220 via input port 221.

Optical signals to be added are inserted by the appropriate optical components, such as optical transmitters 275 with each individual optical signal to be added having a particular wavelength. The output from an optical transmitter 275 is provided as input to a passive optical combiner 270, which then combines all of the signals from each of its plural input ports onto a single output port. As shown in FIG. 3, the passive optical combiners 270 are configured as a tree so that some of the plural input ports are available for future adds 271. As further shown, only 4 wavelength signals are actually added to the multi-wavelength signal in this particular example. Accordingly, the appropriate number of passive optical combiners 270 and optical transmitters 275 are included within the add path. The combined optical signal from the top-most passive optical combiner 270 includes each of the individual wavelength signals for those optical signals to be added to the multi-wavelength signal. These optical signals to be added enter optical circulator 220 via add port 223 and are circulated to exit from input port 221. These optical signals then pass through and are amplified by EDF segment 241. Fiber Bragg grating or gratings 230 reflect the optical signals to be added back through EDF segment 241 and back into input port 221 of optical circulator 220. Optical circulator 220 outputs the "through" optical signals along with the added optical signals via output port 222 on output optical fiber 250. The gain of the "added" optical signals is determined by $2 \times L_2$, where $L_2$ is the length of EDF segment 241, since the added optical signals pass through EDF segment 241 twice. Returning to FIG. 4 which shows the 16-wavelength system with the initial 50% add/drop service, 8 of the wavelengths are added as part of the initial configuration and the remaining 8 wavelengths could be added as part of a future in-service upgrade as illustrated by the populated future adds 271. Other configurations are possible as previously described in the drop context.

As is evident by the above description, lengths $L_1$ and $L_2$ of EDF segments 240 and 241, respectively, can be sized accordingly to compensate for any insertion losses that occur within the drop, add, and "through" paths. Specifically, EDF segment 240 having length $L_1$ provides gain for losses occurring in the drop path and "through" path, while EDF segment 241 having length $L_2$ provides gain for losses occurring in the add path and "through" path. Moreover, the present invention is customizable in that the amount of gain needed for loss compensation in each of the paths can be adjusted by selecting appropriate lengths $L_1$ and $L_2$ for EDF segments 240 and 241 and by selecting an appropriate power level for the pump signal. Consequently, the expandable add/drop system can be designed so that no interruption of existing service will result from future in-service upgrades. Using FIG. 4 as an example, $L_1$ and $L_2$ can be initially sized so that sufficient loss compensation is provided for a maximum amount of signal splitting and combining in the drop and add paths. As more optical signals need to be dropped and/or added as part of a future in-service upgrade, only the pump power would have to be adjusted to account for any additional losses. Therefore, the existing add/drop service is not interrupted because the path will not have to be cut to replace devices as is the case for prior art systems. Moreover, the integrated amplification scheme of the present invention avoids the problems with lumped optical amplifiers in terms of cost, design complexity, and amplification efficiency.

As an example of one practical design implementation for short-reach optical networks, such as metropolitan area rings, lengths $L_1$ and $L_2$ and the pump power could be selected accordingly to compensate for the losses associated with the higher of one of the following:

i) losses in the "through" path, which, for short-reach paths, include losses occurring in the transmission fiber between network nodes. These losses are typically in the range of 5 db to 12 db for short-reach optical networks;

ii) losses associated with dropping optical signals. The sensitivity of the optical receivers and technology used for signal splitting must also be considered in determining these losses. If passive splitting is used, e.g., 3 db couplers, losses for a 16-wavelength system can be about 12 db to 15 db (e.g., 3 db loss for each signal split); and iii) losses associated with adding optical signals. The power of optical transmitters used for the local add channels and technology adopted for signal combining must also be considered in determining these losses. Again, if passive combining is used, e.g., 3 db couplers, losses for a 16-wavelength system can be about 12 db to 15 db (e.g., 3 db loss for each combination of signals).

Consequently, the unique design of the present invention, that is, a segmented EDFA integrated with wavelength selective fiber gratings, provides an add/drop system that does not add any loss to the optical signal being processed. More specifically, the present invention can be designed to compensate for all losses normally associated with the adding, dropping, and "expressing" (i.e., passing through) of wavelengths in the multi-wavelength optical signal. In fact, the present invention is configurable in that it can be customized for a particular application by altering pump power and/or by selecting an appropriate number and lengths of EDF segments as previously described. With this capability, the present invention can even be designed to provide a net gain to the multi-wavelength optical signal to compensate for losses that occur along the fiber path outside of the physical plant where the add/drop system is located. This use of the expandable add/drop system is especially beneficial for short-reach and intermediate-reach optical network applications, such as metropolitan area rings, where fiber losses are generally less than those found in long haul networks.

It should also be noted that the EDFA configuration of the present invention functions as a single-stage amplifier even though multiple EDF segments are used. In particular, the multiple segments are pumped as a single amplifier with one segment being pumped directly while the other segment is pumped by excess pump power through the one segment. Therefore, the present invention uses a single gain element in conjunction with a pump source, wavelength selective elements, and optical transfer devices for amplifying the optical signals in the add, drop, and through paths of the ADM. Moreover, by integrating the amplification function of the EDFA with wavelength-selective adding/dropping via fiber gratings, an expandable, totally wavelengthselective, and loss-less add/drop capability is provided at a lower cost without adding unnecessary design complexity.

The present invention can be beneficially used in a dense wavelength division multiplexed (DWDM) optical ring architecture for metropolitan area networks (MANs). The expandable add/drop system of the present invention is particularly well-suited for MAN ring applications because MANs are typically characterized by a high concentration of add/drop sites within a small geographical region supporting a mix of transport signals. Moreover, the dynamic nature of a MAN requires total flexibility in terms of being able to accommodate additional adds/drops without interrupting the existing service to other users within the densely-populated MAN. For example, local nodes of a typical MAN carry all of the loop traffic into a service node. Additionally, lower capacity distribution rings are generally multiplexed onto the backbone ring at the local nodes. These lower capacity distribution rings are used to add and drop traffic at a number of customer premises nodes which are typically serviced by customer premises equipment such as the SLC®-2000 Access System or DDM-2000 FiberReach Multiplexer, both of which are manufactured by Lucent Technologies, Inc. Distribution rings are typically OC-3 (155 Mbps) or OC-12 (622 Mbps) rings. Thus, those skilled in the art will recognize that the present invention would be particularly useful at local nodes of a MAN because of the selective and expandable add/drop capability. Although a MAN application has been specifically described herein, there are numerous other optical networking applications that would also be well-served by the expandable optical add/drop system according to the principles of the present invention.

It will be understood that the particular embodiments described above are only illustrative of the principles of the present invention, and that various modifications could be made by those skilled in the art without departing from the spirit and scope of the present invention. Accordingly, the scope of the present invention is limited only by the claims that follow.

What is claimed is:

1. An expandable optical add/drop system including
   an optical add/drop multiplexer element having an input port and an output port, said input port for receiving a multi-wavelength optical signal having individual optical signals of different wavelengths, said multiplexer element further including a drop path for carrying at least one of said individual optical signals dropped from said multi-wavelength optical signal, and an add path for carrying at least one optical signal of a particular wavelength to be added to said multi-wavelength optical signal, and a through path coupled between said input port and said output port, wherein a common portion is defined by portions of each of said add, drop and through paths such that said common portion is capable of being used for adding and dropping individual optical signals and for carrying said multi-wavelength signal,
   a passive optical signal splitting device coupled to said drop path for receiving said at least one individual optical signal to be dropped from said multi-wavelength optical signal, and for distributing said at least one individual optical signal via plural output ports, and
   a tunable optical filter coupled to one of said plural output ports, said tunable optical filter being operable to selectively pass only one individual optical signal of a particular wavelength,
   said common portion including a wavelength-selective apparatus with integrated amplification for use in the expandable add/drop system, the apparatus comprising:
      at least one wavelength selective element disposed in a wavelength-selective path between said input port and said output port;
      an optically amplifying rare earth-doped fiber section integrated with said wavelength-selective path, said optically amplifying rare earth-doped fiber section including
         a first segment coupled between said input port and said at least one wavelength selective element, and
         a second segment coupled between said at least one wavelength selective element and said output port; and
      a source of pump light coupled to and operable to pump said optically amplifying rare earth-doped fiber section,
   wherein said at least one wavelength selective element is adapted to selectively reflect said at least one individual optical signal to be dropped from said multi-wavelength optical signal across said drop path via said first segment,
   wherein other said plural output ports are adapted to receive additional passive optical signal splitting devices and tunable optical filters in a tree configuration for selectively passing other reflected individual optical signals dropped from said multi-wavelength optical signal.

2. The system of claim 1, further including
   an optical transmitter device for transmitting said individual optical signal of a particular wavelength to be added to said multi-wavelength optical signal, and
   a passive optical signal combining device having plural input ports, one of said plural input ports being coupled to said optical transmitter device for receiving said individual optical signal to be added, said passive optical signal combining device further including an output port coupled to said add path for distributing said individual optical signal to be added to said multi-wavelength optical signal,
   wherein said at least one wavelength selective element is adapted to selectively reflect said individual optical signal to be added to said multi-wavelength optical signal, and
   wherein other said plural input ports are adapted to receive additional passive optical combining devices and optical transmitter devices in a tree configuration for adding other individual optical signals to said multi-wavelength optical signal.

3. The system of claim 2, wherein the length of said first segment is selected to provide optical amplification gain for said individual optical signals dropped from said multi-wavelength optical signal, wherein the length of said second segment is selected to provide optical amplification gain for said individual optical signals added to said multi-wavelength optical signal, the optical amplification gain for non-reflected optical signals being determined by the combined length of said first and second segments, wherein the optical add/drop system is selectively configurable to provide loss compensation for said added and dropped optical signals by changing the lengths of said first and second segments and by selectively controlling the power of said pump light source.

4. The system of claim 2, wherein said at least one wavelength selective element is selectively tunable to reflect any one of said individual optical signals of different wavelengths from said multi-wavelength optical signal.

5. The system of claim 1, wherein said rare earth-doped optical fiber comprises erbium-doped optical fiber.

6. The system of claim 1, wherein said at least one wavelength selective element is an in-fiber Bragg grating.

7. The system of claim 1, wherein said passive optical signal splitting device comprises a 1×N optical coupler.

8. The system of claim 1, wherein said tunable optical filter comprises a fiber Fabry-Perot filter.

9. The system of claim 2, wherein said passive optical signal combining device comprises a N×1 optical coupler.

10. The system of claim 1, wherein said pump light source is coupled to said optically amplifying rare earth-doped fiber section in a pump arrangement selected from the group consisting of a co-propagating pump configuration, a counter-propagating pump configuration, and a hybrid bi-directional pump configuration.

11. The system of claim 3, wherein said optical amplification gain provided by said optically amplifying rare earth-doped fiber section is selectively adjustable to compensate for losses associated with the addition of said passive optical signal splitting devices, said passive optical signal combining devices, said tunable optical filters, and said optical transmitter devices during service upgrades on a non-interrupting basis.

12. An expandable optical add/drop system including
an optical add/drop multiplexer element having an input port and an output port, said input port for receiving a wavelength division multiplexed (WDM) optical signal having individual optical channels of different wavelengths, said multiplexer element further including a drop path for carrying at least one of said individual optical channels dropped from said WDM optical signal, and an add path for carrying at least one optical channel of a particular wavelength to be added to said WDM optical signal, and a through path coupled between said input port and said output port, wherein a common portion is defined by portions of each of said add, drop and through paths such that said common portion is capable of being used for adding and dropping individual optical channels and for carrying said WDM optical signal,
a passive optical signal splitting device coupled to said drop path for receiving said at least one individual optical channel to be dropped from said WDM optical signal, and for distributing said at least one individual optical channel via plural output ports, and
a tunable optical filter coupled to one of said plural output ports, said tunable optical filter being operable to selectively pass only one individual optical channel of a particular wavelength,
said common portion including a wavelength-selective apparatus with integrated amplification for use in the expandable add/drop system, the apparatus comprising:
at least one wavelength selective element disposed in a wavelength-selective path between said input port and said output port;
a rare earth-doped optical fiber section integrated along said wavelength-selective path between said input and output ports for optically amplifying said WDM optical signal; and
a source of pump light coupled to and operable to pump said rare earth-doped optical fiber section,
wherein said at least one wavelength selective element is adapted to selectively reflect said at least one individual optical channel to be dropped from said WDM optical signal across said drop path via said first segment,
wherein other said plural output ports are adapted to receive additional passive optical signal splitting devices and tunable optical filters in a tree configuration for selectively passing other reflected individual optical channels dropped from said WDM optical signal.

13. The system of claim 12, further including
an optical transmitter device for transmitting an individual optical channel of a particular wavelength to be added to said WDM optical signal, and
a passive optical signal combining device having plural input ports, one of said plural input ports being coupled to said optical transmitter device for receiving said individual optical channel to be added, said passive optical signal combining device further including an output port coupled to an add port of said second optical circulator for distributing said individual optical channel to be added,
wherein said at least one wavelength selective fiber grating is adapted to selectively reflect said individual optical channel to be added to said WDM optical signal, and
wherein other said plural input ports are adapted to receive additional passive optical combining devices and optical transmitter devices in a tree configuration for adding other individual optical channels to said WDM optical signal.

14. The system of claim 13, wherein said rare earth-doped optical fiber section comprises:
a first segment; and
a second segment contiguous with said first segment,
wherein the length of said first segment is selected to provide optical amplification gain for said individual optical channels dropped from said WDM optical signal, wherein the length of said second segment is selected to provide optical amplification gain for said individual optical channels added to said WDM optical signal, the optical amplification gain for non-reflected optical channels being determined by the combined length of said first and second segments, and
wherein the optical add/drop system is selectively configurable to provide loss compensation for said added and dropped optical channels by changing the lengths of said first and second segments and by selectively controlling the power of said pump light source.

15. An expandable optical add/drop system including
an optical add/drop multiplexer element having a first and second directional optical transfer device, said first directional optical transfer device being coupled to receive a multi-wavelength optical signal having individual optical signals of different wavelengths,
a passive optical signal splitting device coupled to a drop port of said first directional optical transfer device for receiving at least one individual optical signal to be dropped from said multi-wavelength optical signal, and for distributing said at least one individual optical signal via plural output ports, and a tunable optical filter coupled to one of said plural output ports, said tunable optical filter being operable to selectively pass only one individual optical signal of a particular wavelength, a wavelength-selective apparatus with integrated amplification for use in the expandable optical add/drop system, comprising:

at least one wavelength selective element disposed in a wavelength selective path between said first and second directional optical transfer devices;

an optically amplifying rare earth-doped fiber section integrated with said wavelength-selective path, said optically amplifying rare earth-doped fiber section including a first segment coupled between said first directional optical transfer device and said at least one wavelength selective element, and a second segment coupled between said at least one wavelength selective element and said second directional optical transfer device; and a source of pump light coupled to and operable to pump said rare earth-doped fiber section, wherein said at least one wavelength selective element is adapted to selectively reflect said at least one individual optical signal to be dropped from said multi-wavelength optical signal via said drop port, and wherein other said plural output ports are adapted to receive additional passive optical signal splitting devices and tunable optical filters in a tree configuration for selectively passing other reflected individual optical signals dropped from said multi-wavelength optical signal.

16. The system of claim 15, further including an optical transmitter device for transmitting an individual optical signal of a particular wavelength to be added to said multi-wavelength optical signal, and a passive optical signal combining device having plural input ports, one of said plural input ports being coupled to said optical transmitter device for receiving said individual optical signal to be added, said passive optical signal combining device further including an output port coupled to an add port of said second directional optical transfer device for distributing said individual optical signal to be added, wherein said at least one wavelength selective fiber grating is adapted to selectively reflect said individual optical signal to be added to said multi-wavelength optical signal, and wherein other said plural input ports are adapted to receive additional passive optical combining devices and optical transmitter devices in a tree configuration for adding other individual optical signals to said multi-wavelength optical signal.

17. The system of claim 16, wherein the length of said first segment is selected to provide optical amplification gain for said individual optical signals dropped from said multi-wavelength optical signal, wherein the length of said second segment is selected to provide optical amplification gain for said individual optical signals added to said multi-wavelength optical signal, the optical amplification gain for non-reflected optical signals being determined by the combined length of said first and second segments, wherein said optical add/drop system is selectively configurable to provide loss compensation for said added and dropped optical signals by changing the lengths of said first and second segments and by selectively controlling the power of said pump light source.

18. The system of claim 16, wherein said at least one wavelength selective element is selectively tunable to reflect any one of said individual optical signals of different wavelengths from said multi-wavelength optical signal.

19. The system of claim 16, wherein said first and second directional optical transfer devices comprise a first and second optical circulator, respectively.

20. The system of claim 15, wherein said rare earth-doped optical fiber comprises erbium-doped optical fiber.

21. The system of claim 15, wherein said at least one wavelength selective element is an in-fiber Bragg grating.

22. The system of claim 15, wherein said passive optical signal splitting device comprises a 1×N optical coupler.

23. The system of claim 15, wherein said tunable optical filter comprises a fiber Fabry-Perot filter.

24. The system of claim 16, wherein said passive optical signal combining device comprises a N×1 optical coupler.

25. The system of claim 15, wherein said pump light source is coupled to said rare earth-doped fiber section in a pump arrangement selected from the group consisting of a co-propagating pump configuration, a counter-propagating pump configuration, and a hybrid bi-directional pump configuration.

26. The system of claim 17, wherein said optical amplification gain provided by said optically amplifying rare earth-doped fiber section is selectively adjustable to compensate for losses associated with the addition of said passive optical signal splitting devices, said passive optical signal combining devices, said tunable optical filters, and said optical transmitter devices.

27. An expandable optical add/drop system including an optical add/drop multiplexer element having a first and second optical circulator, said first optical circulator being coupled to receive a wavelength division multiplexed (WDM) optical signal having individual optical channels of different wavelengths, a passive optical signal splitting device coupled to a drop port of said first optical circulator for receiving at least one individual optical channel to be dropped from said WDM optical signal, and for distributing said at least one individual optical channel via plural output ports, and a tunable optical filter coupled to one of said plural output ports, said tunable optical filter being operable to selectively pass only one individual optical channel of a particular wavelength, a wavelength-selective apparatus with integrated amplification for use in the expandable optical add/drop system, comprising:

at least one wavelength selective element disposed in a wavelength selective path between said first and second optical circulators;

a rare earth-doped optical fiber integrated along said wavelength-selective path for optically amplifying said WDM optical signal; and a source of pump light coupled to and operable to pump said rare earth-doped optical fiber, wherein said at least one wavelength selective element is adapted to selectively reflect said at least one individual optical channel to be dropped from said WDM optical signal via said first optical circulator, and wherein other said plural output ports are adapted to receive additional passive optical signal splitting devices and tunable optical filters in a tree configuration for selectively passing other reflected individual optical channels dropped from said WDM optical signal.

28. The system of claim 27, further including an optical transmitter device for transmitting an individual optical channel of a particular wavelength to be added to said WDM optical signal, and a passive optical signal combining device having plural input ports, one of said plural input ports being coupled to said optical transmitter device for receiving said individual optical channel to be added, said passive optical signal combining device further including an output port coupled to an add port of said second optical circulator for distributing said individual optical channel to be added, wherein said at least one wavelength selective fiber grating is adapted to selectively reflect said individual optical channel to be added to said WDM optical signal, and wherein other said plural input ports are adapted to receive additional passive optical combining devices and optical transmitter devices in a tree configuration for adding other individual optical channels to said WDM optical signal.

29. The system of claim 28, wherein said rare earth-doped optical fiber comprises:

a first segment; and a second segment contiguous with said first segment, wherein the length of said first segment is selected to provide optical amplification gain for said individual optical channels dropped from said WDM optical signal, wherein the length of said second segment is selected to provide optical amplification gain for said individual optical channels added to said WDM optical signal, the optical amplification gain for non-reflected optical channels being determined by the combined length of said first and second segments, and wherein said optical add/drop system is selectively configurable to provide loss compensation for said added and dropped optical channels by changing the lengths of said first and second segments and by selectively controlling the power of said pump light source.

* * * * *